（12）United States Patent
Yoshimoto et al.

(10) Patent No.: US 12,099,389 B2
(45) Date of Patent: Sep. 24, 2024

(54) SYSTEMS AND METHODS FOR THERMAL MANAGEMENT USING A MIXED TOPOLOGY SWITCHING REGULATOR

(71) Applicant: Apple Inc., Cupertino, CA (US)

(72) Inventors: Mark A Yoshimoto, San Jose, CA (US); Mark D Mesaros, San Jose, CA (US)

(73) Assignee: Apple Inc., Cupertino, CA (US)

( * ) Notice: Subject to any disclaimer, the term of this patent is extended or adjusted under 35 U.S.C. 154(b) by 39 days.

(21) Appl. No.: 17/740,637

(22) Filed: May 10, 2022

(65) Prior Publication Data

US 2023/0367376 A1 Nov. 16, 2023

(51) Int. Cl.
*G06F 1/20* (2006.01)
*G01K 13/00* (2021.01)

(52) U.S. Cl.
CPC ............. *G06F 1/206* (2013.01); *G01K 13/00* (2013.01)

(58) Field of Classification Search
CPC ................................ G06F 1/206; G01K 13/00
USPC ....................................................... 713/300
See application file for complete search history.

(56) References Cited

U.S. PATENT DOCUMENTS

| | | | | | |
|---|---|---|---|---|---|
| 3,174,094 | A | * | 3/1965 | Farnsworth | G05F 1/618 323/224 |
| 4,056,689 | A | * | 11/1977 | Freimanis | H04M 19/008 379/413 |
| 4,561,296 | A | * | 12/1985 | Guagliumi | F02N 11/0814 73/114.58 |
| 4,570,114 | A | * | 2/1986 | Heim | G05F 3/227 323/313 |
| 5,194,802 | A | * | 3/1993 | Hill | G05F 1/563 323/280 |
| 5,726,874 | A | * | 3/1998 | Liang | G05D 23/1909 363/141 |
| 5,815,358 | A | * | 9/1998 | Tihanyi | H03K 17/0822 361/103 |
| 6,031,354 | A | * | 2/2000 | Wiley | G01R 31/396 320/132 |
| 6,531,848 | B1 | * | 3/2003 | Chitsazan | H02J 7/0016 320/153 |
| 6,628,491 | B1 | * | 9/2003 | Tihanyi | H02H 5/04 361/103 |
| 6,933,869 | B1 | * | 8/2005 | Starr | G11C 29/12005 341/120 |

(Continued)

FOREIGN PATENT DOCUMENTS

| | | |
|---|---|---|
| CN | 215450013 U | 1/2022 |
| JP | 2007-259661 A | 8/2001 |
| JP | 2007140650 A | 6/2007 |

OTHER PUBLICATIONS

Office Action for Japanese Patent Application No. 2023-077335 dated Jun. 19, 2024; 4 pgs.

*Primary Examiner* — Paul R. Myers
(74) *Attorney, Agent, or Firm* — FLETCHER YODER PC

(57) ABSTRACT

An electronic device includes a die, one or more power stages, and one or more sensors electrically coupled to the one or more stages and to determine data associated with a temperature of the die. The electronic device includes one or more off-die power stages external to the die and processing circuitry configured to cause the one or more off-die power stages to activate based on the data indicating that the temperature is greater than a temperature threshold.

20 Claims, 6 Drawing Sheets

(56) References Cited

U.S. PATENT DOCUMENTS

| | | | |
|---|---|---|---|
| 7,478,253 B2 * | 1/2009 | Levit | G06F 1/3296 713/340 |
| 8,310,205 B1 * | 11/2012 | Hamburgen | H02J 7/007194 324/426 |
| 9,099,922 B2 | 8/2015 | Toosky et al. | |
| 10,228,746 B1 * | 3/2019 | Ram | G06F 1/3206 |
| 10,298,040 B2 | 5/2019 | Zarkhin et al. | |
| 2002/0000880 A1 * | 1/2002 | Burns | H03G 3/3042 330/129 |
| 2002/0041178 A1 | 4/2002 | Hiraki et al. | |
| 2002/0144163 A1 * | 10/2002 | Goodfellow | H02M 3/157 713/300 |
| 2004/0036460 A1 * | 2/2004 | Chatal | G01K 7/01 323/313 |
| 2004/0124909 A1 * | 7/2004 | Haider | G05F 3/205 327/540 |
| 2005/0201188 A1 * | 9/2005 | Donze | G11C 7/04 365/232 |
| 2007/0182421 A1 * | 8/2007 | Janke | G06F 21/81 324/522 |
| 2008/0239608 A1 * | 10/2008 | Yoshitomi | H02H 5/04 361/103 |
| 2008/0315934 A1 * | 12/2008 | Engl | G06F 1/22 327/306 |
| 2009/0328050 A1 * | 12/2009 | Liu | G06F 9/5088 718/104 |
| 2010/0305770 A1 * | 12/2010 | Bhowmik | B60L 58/21 324/426 |
| 2010/0321091 A1 * | 12/2010 | Bernstein | H03K 19/00384 327/512 |
| 2010/0321817 A1 * | 12/2010 | Aida | G11B 5/09 360/60 |
| 2011/0248692 A1 * | 10/2011 | Shehu | G05F 1/577 323/272 |
| 2011/0301777 A1 * | 12/2011 | Cox | G06F 1/3203 713/300 |
| 2012/0081168 A1 * | 4/2012 | Hastings | H03F 1/305 327/346 |
| 2012/0200967 A1 * | 8/2012 | Mikolajczak | H02H 9/025 361/79 |
| 2014/0306658 A1 * | 10/2014 | Kinomura | H02J 3/322 320/109 |
| 2014/0350716 A1 * | 11/2014 | Fly | B25H 3/00 700/214 |
| 2015/0046729 A1 * | 2/2015 | Fukuoka | G06F 13/24 713/320 |
| 2015/0052622 A1 * | 2/2015 | Cabler | G06F 21/70 726/34 |
| 2015/0303679 A1 * | 10/2015 | Li | H02H 5/042 361/106 |
| 2015/0381113 A1 * | 12/2015 | Price | H03F 3/45977 324/123 R |
| 2017/0063121 A1 * | 3/2017 | Tonarelli | H02J 7/007192 |
| 2017/0338646 A1 * | 11/2017 | Djelassi | H02H 3/04 |
| 2018/0042798 A1 * | 2/2018 | Davies | A47C 1/035 |
| 2018/0157315 A1 * | 6/2018 | Ehsan | G06F 1/3296 |
| 2020/0251922 A1 * | 8/2020 | Wang | H02J 7/007192 |
| 2021/0336528 A1 * | 10/2021 | Zafarana | H02M 3/1584 |
| 2022/0129053 A1 * | 4/2022 | Ronnau | G06F 1/324 |
| 2023/0031415 A1 * | 2/2023 | Rajwan | G06F 1/3206 |

* cited by examiner

SYSTEMS AND METHODS FOR THERMAL MANAGEMENT USING A MIXED TOPOLOGY SWITCHING REGULATOR

BACKGROUND

The present disclosure generally relates to thermal management of a semiconductor die, semiconductor package, integrated circuit, printed circuit board, system-level printed circuit board, or electronic device (e.g., a smartphone or other computing device), and more particularly, to thermal and current management of a switching regulator on such components or devices.

In mobile devices, thermal management is an important design factor. In particular, components associated with power management or generation may produce higher levels of thermal output. One of these components may be a power regulator (e.g., a switching regulator). A switching regulator may include one or more power stages that are disposed in a package. However, the one or more power stages may produce heat that may limit a design or incorporation of other components on the package and/or off the package, as the generated heat may reduce lifetime of, decrease performance of, or even damage, components on the package and/or off the package.

SUMMARY

In one embodiment, an electronic device may include a die, one or more power stages disposed on the die, and one or more sensors electrically coupled to the one or more power stages and to determine data associated with a temperature of the die. The electronic device may include one or more off-die power stages external to the die and processing circuitry to cause the one or more off-die power stages to activate based on the data indicating that the temperature is greater than a temperature threshold.

In another embodiment, a method may include receiving, via a processor, sensor data associated with one of more internal power stages disposed on a die, determining, via the processor, that the sensor data indicates a temperature of the die that is greater than a first temperature threshold, and causing, via the processor, one or more external power stages to activate based on the data indicating the temperature of the die is greater than the first temperature threshold, where the one or more external power stages is disposed external to the die.

In a further embodiment, an electronic device may include a circuit package including a first set of power stages. The electronic device may include a second set of power stages coupled to the first set of power stages, where the first set of power stages and the second set of power stages are each configured to convert an input voltage to an output voltage, the second set of power stages are disposed externally to the circuit package, and the second set of power stages are activated based on a temperature of the first set of power stages.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

Figure 1:
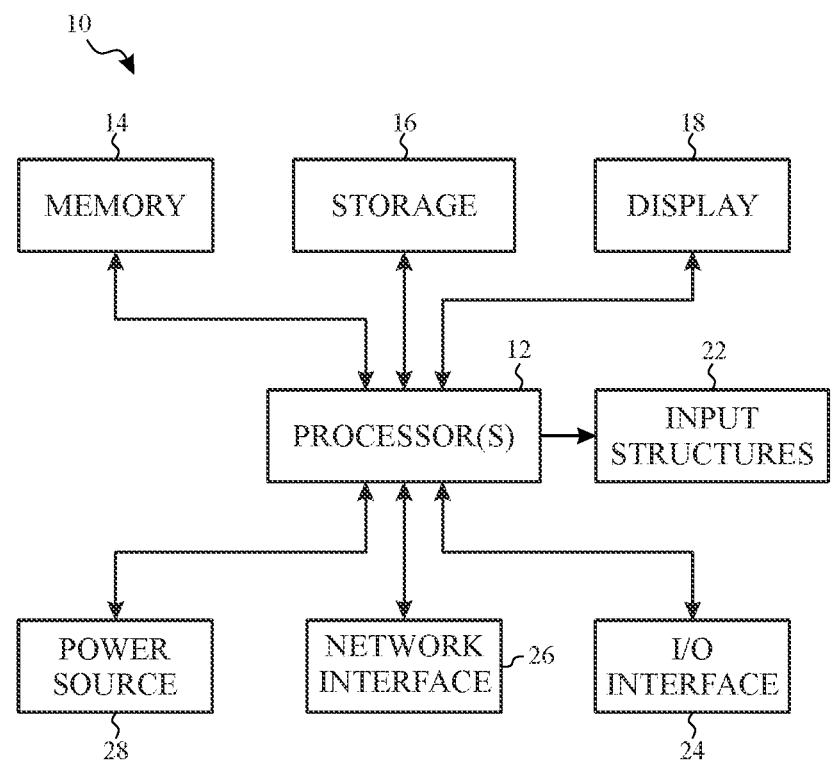
FIG. 1 is a block diagram of an electronic device, in accordance with an embodiment of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the terms "approximately," "near," "about," "close to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on). Moreover, it should be understood that any exact values, numbers, measurements, and so on, provided herein, are contemplated to include approximations (e.g., within a margin of suitable or contemplatable error) of the exact values, numbers, measurements, and so on.

As discussed above, a switching regulator may include one or more internal power stages that produce thermal energy (e.g., heat) when active. That is, the switching regulator may include a package where the one or more internal power stages are disposed. The package may include a casing having one or more semiconductor devices and/or integrated circuits. For example, the package may support electrical contacts that electrically couple to a circuit board. The package may be disposed on a die (e.g., an integrated circuit die) and coupled to one or more components on the die. In some embodiments, the package may be coupled to one or more components disposed externally of the die. An amount of thermal energy in the package may be a limiting factor in design, since performance and/or lifetime of the package may be impacted as the thermal energy in the package rises.

As such, embodiments disclosed herein include implementing a mixed topology switching regulator having one or more internal power stages disposed on a package on a die and one or more external power stages located external to the package and/or the die. That is, the one or more external or off-die power stages may not be disposed on the package and/or may be disposed on a different or separate die or integrated circuit than the die upon which the package is disposed. Additionally or alternatively, the one or more external power stages may be disposed on a circuit board not including the die and/or the package, or on a circuit board that includes the die and/or the package, but not on the die and/or package itself. Furthermore, the one or more external power stages may have a greater surface area than the one or more internal power stages. As such, disposing the one or more external power stages external to the package may enable greater exposure of overall surface area of the power stages to ambient air, thus enabling better cooling. That is, the larger surface area of each external power stage of the one or more external power stages may allow for heat to be dissipated more easily and for air to flow between each external power stage to further dissipate heat. Moreover, activating the one or more external power stages may offload current handled by the one or more internal power stages to the one or more external power stages. When the temperature of the package reaches and/or exceeds a temperature threshold, the one or more external power stages may be activated. By activating the one or more external power stages, the thermal energy that may be generated in package may be dissipated externally of the package. As such, the amount of thermal energy in the package during operation may be reduced.

In some embodiments, the one or more external power stages may be activated based on current load of the package. For example, the one or more external power stages may be activated based on a current load handled by each active power stage prior to activating the one or more external power stages based on the amount of thermal energy. When the current load on the package reaches and/or exceeds a current load threshold, the one or more external power stages may be activated. The activation of the one or more external power stages based on the current load on the package may take priority over the activation of the one or more external power stages based on the amount of thermal energy in the package.

With the foregoing in mind, a general description of suitable electronic devices that may employ switching mixed topology regulators in their circuitry will be provided below. Turning first to FIG. 1, an electronic device 10 according to an embodiment of the present disclosure may include, among other things, one or more processor(s) 12, memory 14, nonvolatile storage 16, a display 18, input structures 22, an input/output (I/O) interface 24, a network interface 26, and a power source 28. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in electronic device 10.

Figure 2:
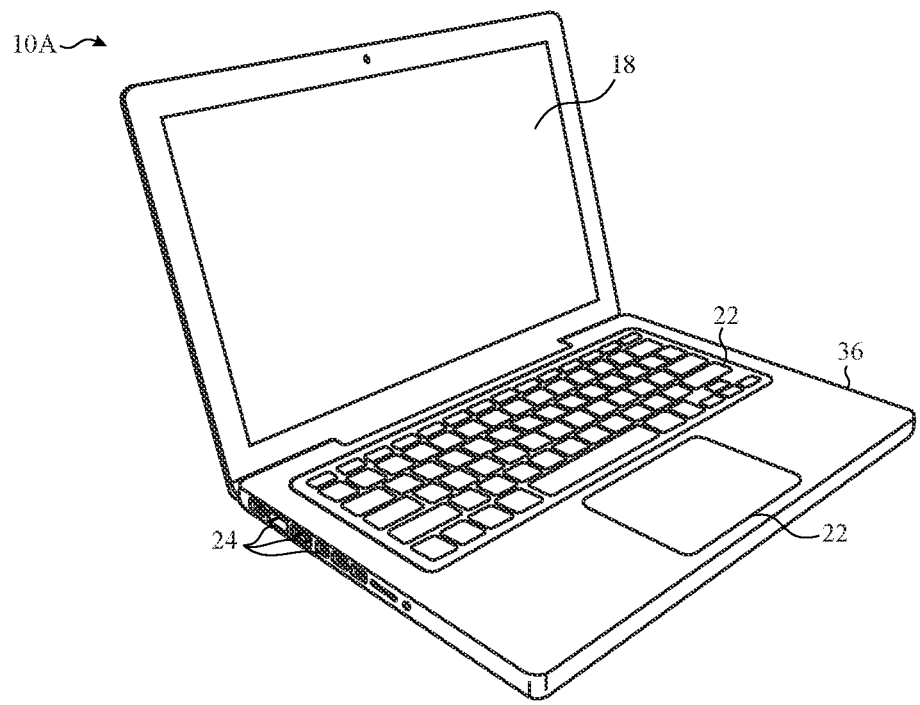
FIG. 2 is a perspective view of the electronic device of FIG. 1 in the form of a notebook computer, in accordance with an embodiment of the present disclosure.
Figure 4:
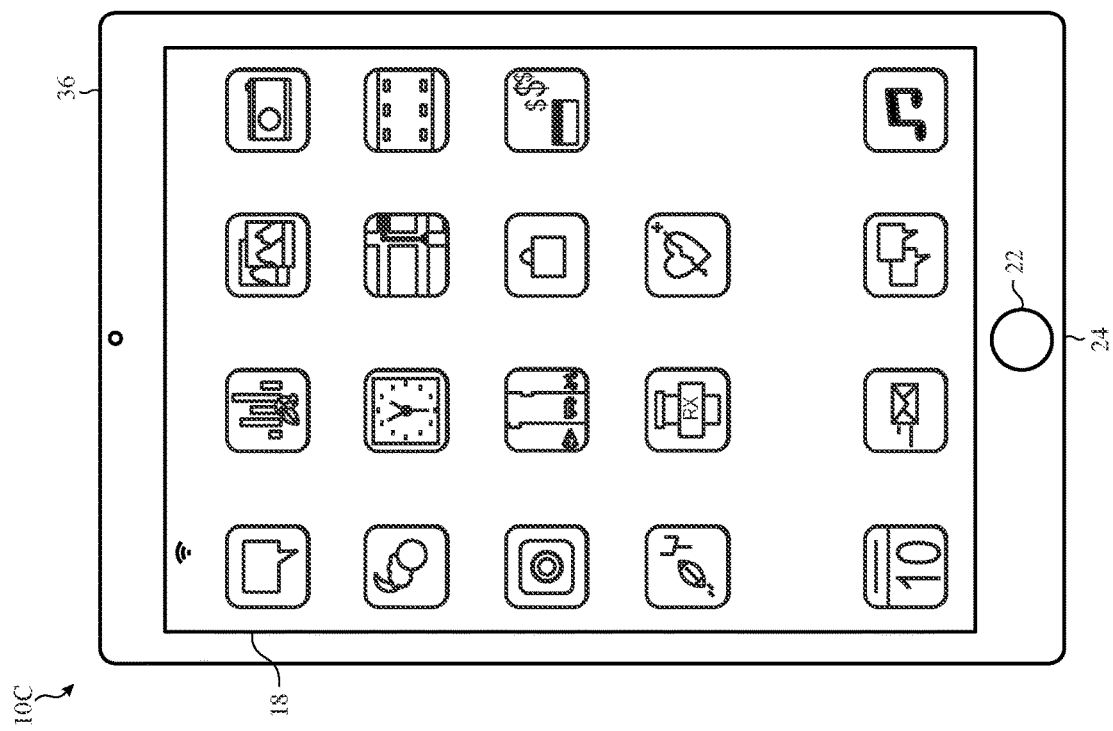
FIG. 4 is a front view of the electronic device of FIG. 1 in the form of portable tablet computer, in accordance with an embodiment of the present disclosure.
Figure 3:
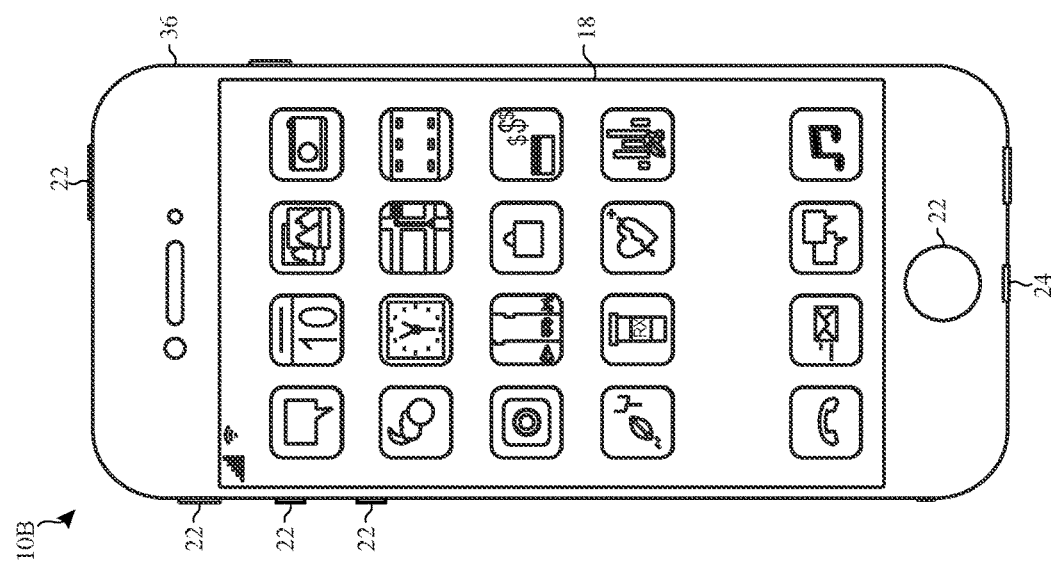
FIG. 3 is a front view of the electronic device of FIG. 1 in the form of a handheld device, in accordance with an embodiment of the present disclosure.
Figure 5:
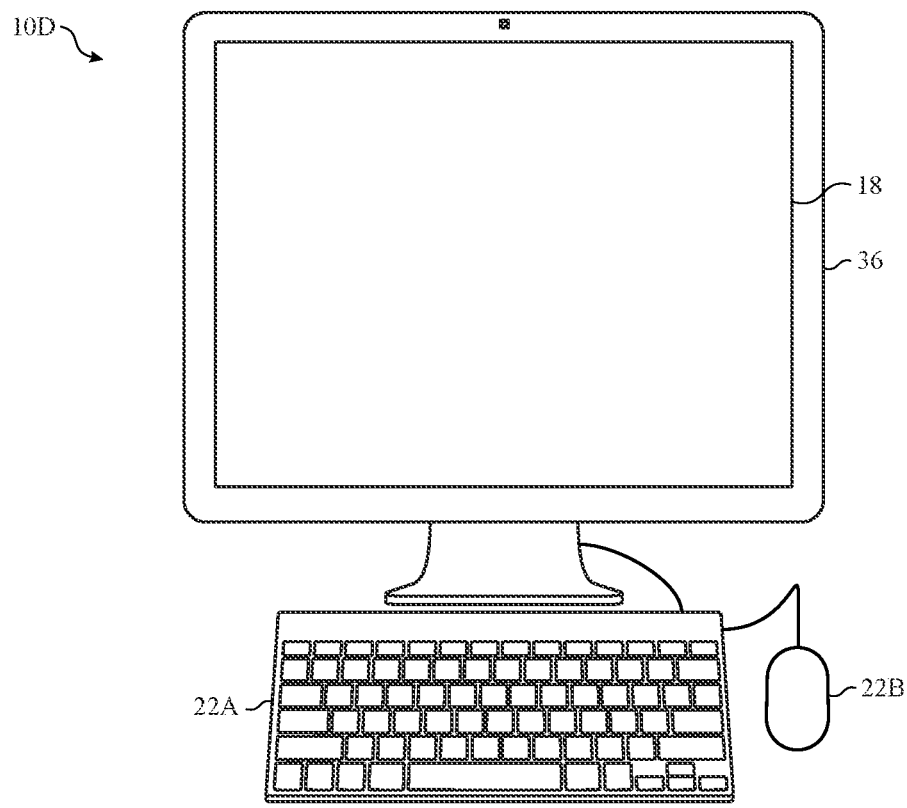
FIG. 5 is a front view of the electronic device of FIG. 1 in the form of a desktop computer, in accordance with an embodiment of the present disclosure.
Figure 6:
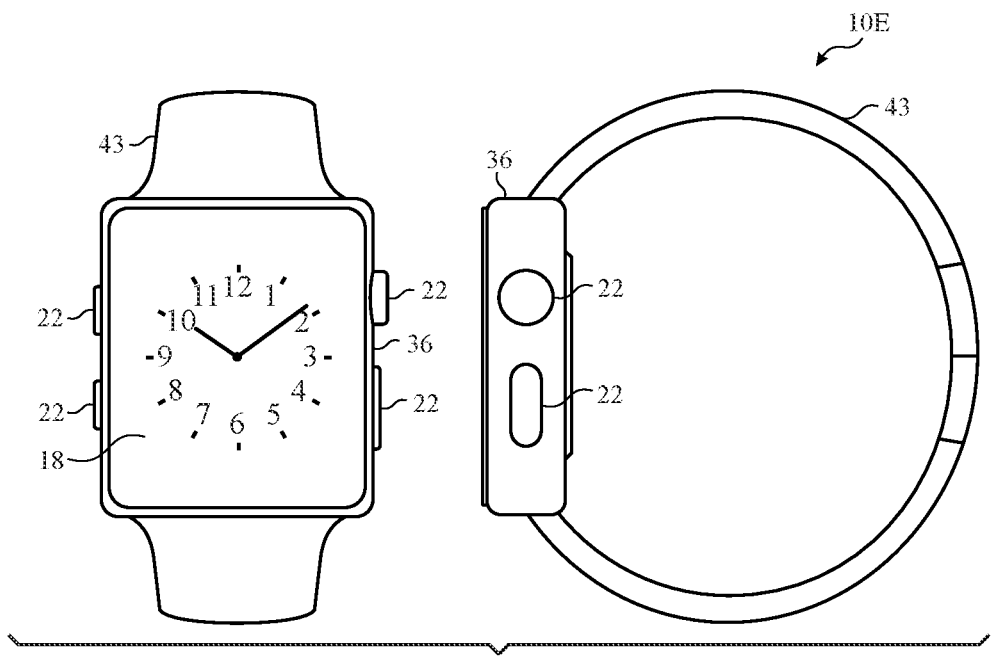
FIG. 6 is a front and side view of the electronic device of FIG. 1 in the form of a wearable electronic device, in accordance with an embodiment of the present disclosure.

By way of example, the electronic device 10 may represent a block diagram of the notebook computer depicted in FIG. 2, the handheld device depicted in FIG. 3, the handheld device depicted in FIG. 4, the desktop computer depicted in FIG. 5, the wearable electronic device depicted in FIG. 6, or similar devices. It should be noted that the processor(s) 12 and other related items in FIG. 1 may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor(s) 12 may be operably coupled with the memory 14 and the nonvolatile storage 16 to perform various algorithms. Such programs or instructions executed by the processor(s) 12 may be stored in any suitable article of manufacture that includes one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor(s) 12 to enable the electronic device 10 to provide various functionalities.

In certain embodiments, the display 18 may be a liquid crystal display (LCD), which may allow users to view images generated on the electronic device 10. In some embodiments, the display 18 may include a touch screen, which may allow users to interact with a user interface of the electronic device 10. Furthermore, it should be appreciated that, in some embodiments, the display 18 may include one or more organic light emitting diode (OLED) displays, or some combination of LCD panels and OLED panels.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. The network interface 26 may include, for example, one or more interfaces for a personal area network (PAN), such as a Bluetooth network, for a local area network (LAN) or wireless local area network (WLAN), such as an 802.11x Wi-Fi network, and/or for a wide area network (WAN), such as a 3rd generation (3G) cellular network, 4th generation (4G) cellular network, Long-Term Evolution (LTE) cellular network, Long-Term Evolution license assisted access (LTE-LAA) cellular network, 5th generation (5G) cellular network, or New Radio (NR) cellular network. The network interface 26 may also include one or more interfaces for, for example, broadband fixed wireless access networks (WiMAX), mobile broadband Wireless networks (mobile WiMAX), asynchronous digital subscriber lines (e.g., ADSL, VDSL), digital video broadcasting-terrestrial (DVB-T) and its extension DVB Handheld (DVB-H), ultra-wideband (UWB), alternating current (AC) power lines, and so forth. Network interfaces 26 such as the one described above may benefit from the use of tuning circuitry, impedance matching circuitry and/or noise filtering circuits that may include polymer capacitors such as the ones described herein. As further illustrated, the electronic device 10 may include a power source 28. The power source 28 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may include computers that are generally portable (such as laptop, notebook, and tablet computers) as well as computers that are generally used in one place (such as conventional desktop computers, workstations, and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 10A, is illustrated in FIG. 2 in accordance with one embodiment of the present disclosure. The depicted computer 10A may include a housing or enclosure 36, a display 18, input structures 22, and ports of an I/O interface 24. In one embodiment, the input structures 22 (such as a keyboard and/or touchpad) may be used to interact with the computer 10A, such as to start, control, or operate a GUI or applications running on computer 10A. For example, a keyboard and/or touchpad may allow a user to navigate a user interface or application interface displayed on display 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an iPod® or iPhone® available from Apple Inc. of Cupertino, California. The handheld device 10B may include an enclosure 36 to protect interior components from physical damage and to shield them from electromagnetic interference. The enclosure 36 may surround the display 18.

The I/O interfaces 24 may open through the enclosure 36 and may include, for example, an I/O port for a hard-wired connection for charging and/or content manipulation using a standard connector and protocol, such as the Lightning connector provided by Apple Inc., a universal serial bus (USB), or other similar connector and protocol.

User input structures 22, in combination with the display 18, may allow a user to control the handheld device 10B. For example, the input structures 22 may activate or deactivate the handheld device 10B, navigate user interface to a home screen, a user-configurable application screen, and/or activate a voice-recognition feature of the handheld device 10B. Other input structures 22 may provide volume control, or may toggle between vibrate and ring modes. The input structures 22 may also include a microphone may obtain a user's voice for various voice-related features, and a speaker may enable audio playback and/or certain phone capabilities. The input structures 22 may also include a headphone input may provide a connection to external speakers and/or headphones.

FIG. 4 depicts a front view of another handheld device 10C, which represents another embodiment of the electronic device 10. The handheld device 10C may represent, for example, a tablet computer, or one of various portable computing devices. By way of example, the handheld device 10C may be a tablet-sized embodiment of the electronic device 10, which may be, for example, a model of an iPad® available from Apple Inc. of Cupertino, California.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. By way of example, the computer 10D may be an iMac®, a MacBook®, or other similar device by Apple Inc. It should be noted that the computer 10D may also represent a personal computer (PC) by another manufacturer. A similar enclosure 36 may be provided to protect and enclose internal components of the computer 10D such as the display 18. In certain embodiments, a user of the computer 10D may interact with the computer 10D using various peripheral input devices, such as the keyboard 22A or mouse 22B (e.g., input structures 22), which may connect to the computer 10D.

Similarly, FIG. 6 depicts a wearable electronic device 10E representing another embodiment of the electronic device 10 of FIG. 1 that may be configured to operate using the techniques described herein. By way of example, the wearable electronic device 10E, which may include a wristband 43, may be an Apple Watch® by Apple, Inc. However, in other embodiments, the wearable electronic device 10E may include any wearable electronic device such as, for example, a wearable exercise monitoring device (e.g., pedometer, accelerometer, heart rate monitor), or other device by another manufacturer. The display 18 of the wearable electronic device 10E may include a touch screen display 18 (e.g., LCD, OLED display, active-matrix organic light emitting diode (AMOLED) display, and so forth), as well as input structures 22, which may allow users to interact with a user interface of the wearable electronic device 10E.

The electronic device 10 may have one or more components to be operated with varying levels of voltage. As such, the electronic device 10 may include a switching regulator located on a die to facilitate conversion of an input direct-current (DC) voltage to a desired output DC voltage. As discussed above, implementing a switching regulator with one or more power stages disposed externally of a main package of the switching regulator may allow for heat generated within the main package to be dissipated externally of the main package.

Figure 7:
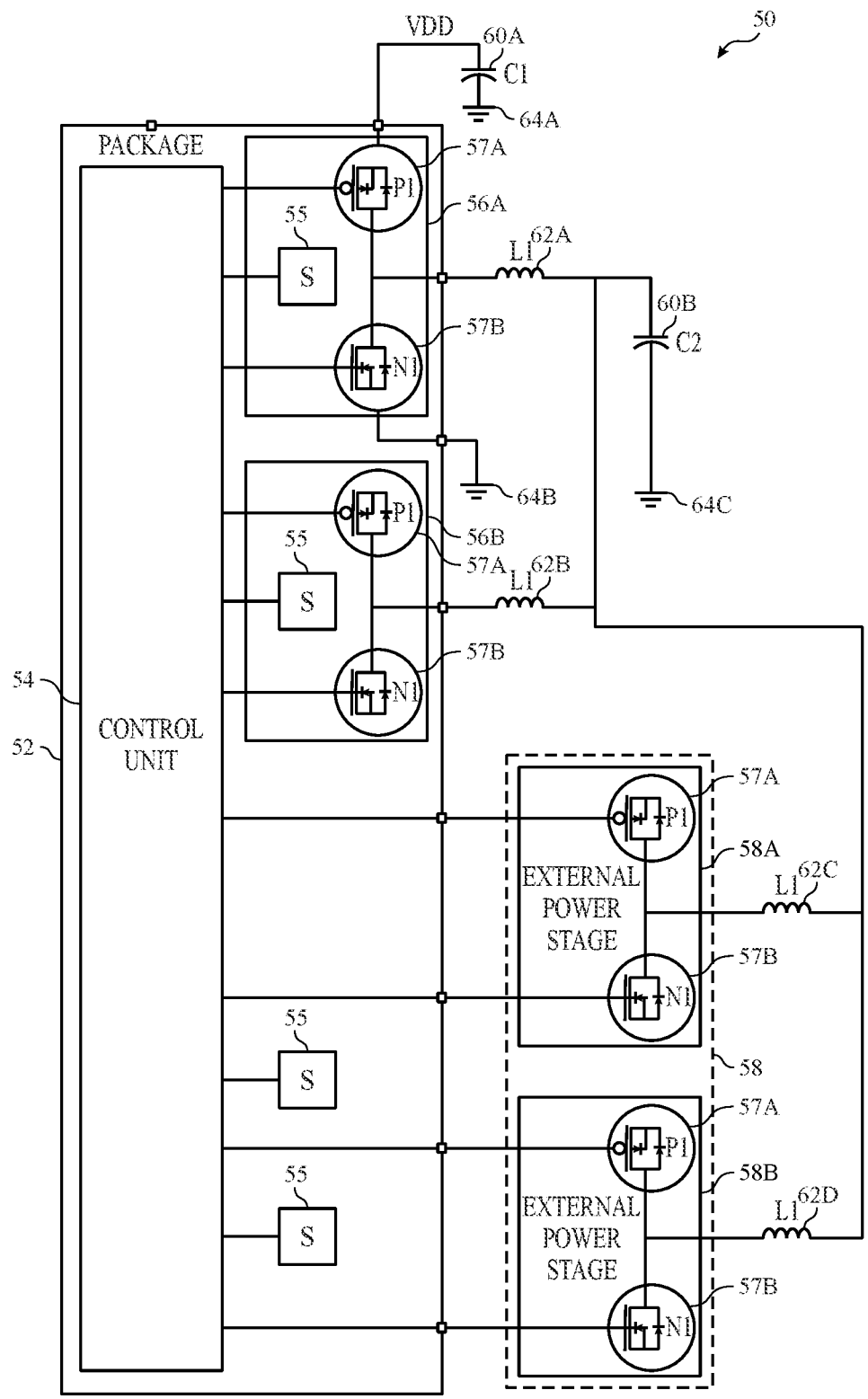
FIG. 7 is a schematic diagram that illustrates a mixed topology switching regulator of the electronic device of FIG. 1, in accordance with an embodiment of the present disclosure.

With the foregoing in mind, FIG. 7 illustrates a mixed topology switching regulator 50 of the electronic device 10, according to embodiments of the present disclosure. The mixed topology switching regulator 50 may include a package 52. The package 52 may be an enclosed structure with one or more electronic components located on a semiconductor die. Additionally, the package 52 may include a silicon package, a circuit package, or any suitable package that includes or incorporates one or more electronic components. The package 52 may include a control unit 54 and a set of one or more internal power stages 56. The control unit 54 may include a buck control unit, a boost control unit, and/or a buck-boost control unit. The buck control unit may generate an output voltage with a lower voltage level from an input voltage to match or correlate to a desired voltage level, the boost control unit may generate an output voltage with a higher voltage level from the input voltage to match or correlate the desired voltage level, and the buck-boost control unit may perform the operations of both the buck control unit and the boost control unit. In some embodiments, the mixed topology switching regulator 50 may be communicatively coupled to the processor 12 located in the electronic device 10. The processor 12 may transmit one or more commands to the control unit 54 of the mixed topology switching regulator 50 to generate the output voltage equal to the desired voltage from the input voltage. That is, the processor 12 may receive a request for the desired voltage from one or more components disposed within the electronic device 10 and may generate one or more commands based on the request. In some embodiments, the processor 12 may include the control unit 54.

Furthermore, there may be one or more sensors 55 disposed such that the one or more sensors 55 are in physical contact with the package 52. In some embodiments, the one or more sensors 55 may be coupled to one or more outputs of the package 52 and/or the mixed topology switching regulator 50. In particular, the one or more sensors 55 may be disposed on the die including the package 52, or external to the die. The one or more sensors 55 may include temperature sensors, current sensors, resistance sensors, voltage sensors, or any other viable sensor that may detect and/or record data about the package 52 and/or the mixed topology switching regulator 50.

The one or more internal power stages 56 may each include two transistors 57A, 57B (collectively 57) of opposite biases (e.g., an N-type metal-oxide-semiconductor field-effect (NMOS) transistor 57A and a P-type metal-oxide-semiconductor field-effect (PMOS) transistor 57B to facilitate the conversion of an input direct-current (DC) voltage to a desired output DC voltage. In some embodiments, the transistor 57A may be a PMOS transistor and the transistor 57B may be either a NMOS transistor. Furthermore, the transistor 57A and transistor 57B may both be NMOS transistors or PMOS transistors. In some embodiments, the one or more internal power stages 56 may each include one transistor 57 of a particular bias (e.g., an NMOS or a PMOS transistor) and a diode for asynchronous operation. Each internal power stage 56 may be activated and deactivated independently of one another. By way of example, internal power stage 56A may be activated prior to activating the internal power stage 56B, or vice versa. The one or more internal power stages 56 may produce heat during operation, which may limit performance and/or life-time of the one or more internal power stages 56 and/or additional components disposed on and/or around the same die as the package 52.

As discussed above, a set of one or more external power stages 58 may be implemented in the mixed topology switching regulator 50 to dissipate heat externally from the package 52. The one or more external power stages 58 may be disposed externally of the package 52 and coupled to the control unit 54 of the package 52. The one or more external power stages 58 may each include two transistors 57 of opposite biases (e.g., an NMOS transistor 57A and a PMOS transistor 57B) to facilitate the conversion of an input direct-current (DC) voltage to a desired output DC voltage. The two transistors 57 may provide synchronous rectification of the incoming voltage signal. In some embodiments, the one or more external power stages 58 may include one transistor 57 of a particular bias (e.g., the NMOS transistor 57A or the PMOS transistor 57B) and a diode for asynchronous operation. Each external power stage 58 may be activated and deactivated independently of one another. By way of example, external power stage 58A may be activated prior to activating the external power stage 58B, or vice versa.

In some embodiments, the one or more external power stages 58 may be disposed on a different die than the package 52 and the one or more internal power stages 56. It should be noted that the one or more internal power stages 56 and the one or more external power stages 58 may be different sizes and be located on dies of different sizes. That is, the one or more external power stages 58 may be of a larger size than the one or more internal power stages 56, such that each of the one or more external power stages 58 may have a larger surface area compared to the one or more internal power stages 56 to dissipate more thermal energy and decrease the overall temperature of the package 52. Furthermore, disposing the one or more external power stages 58 external to the package 52 may reduce the amount of space of the package 52, allow for additional components to be disposed on the package 52, and/or even allow for additional components to be disposed off the package 52 in the electronic device 10 due to the smaller size of the package 52. In some embodiments, the one or more internal power stages 56 and the one or more external power stages 58 may be on the same die. Additionally, the one or more internal power stages 56 and the one or more external power stages 58 may be manufactured via different manufacturing techniques. That is, the one or more external power stages 58 may include improved cooling components and/or additional thermal improvements compared to the one or more internal power stages 56. By way of example, the one or more external power stages 58 may include cooling components unavailable to the one or more internal power stages 56 due to limitations of the one or more internal power stages 56. That is, the one or more internal power stages 56 may include one or more components (e.g., analog signal processing components and/or digital signal processioning components) that limit the type and/or number of components that may be disposed in the one or more internal power stages 56 and/or the package 52.

Furthermore, disposing the one or more external power stages 58 externally from the package 52 and/or on a different die from the package 52 may allow for ambient airflow between components of the electronic device 10. As discussed above, the one or more external power stages 58 may have a larger surface area than the one or more internal power stages 56, where the larger surface area may allow for better heat dissipation. Additionally, the one or more external power stages 58 are disposed externally from the package 52. As such, disposing the one or more external power stages external to the package may enable greater exposure of overall surface area of the power stages to ambient air, thus enabling better cooling. Furthermore, each external power stage 58 may be disposed in different locations in the electronic device 10 to efficiently dissipate heat throughout the electronic device 10. For example, the one or more external power stages 58 may be mounted on one or more circuit boards in the electronic device 10 different from a circuit board with the package 52. In some embodiments, the one or more external power stages 58 may be mounted on the circuit board with the package 52. The one or more external power stages 58 may dissipate heat directly into the one or more circuit boards to enable better cooling. That is, each component in the package 52 may dissipate heat through shared solder connections (e.g., solder balls) and/or vias due to the monolithic nature of the package 52. In this way, the one or more external power stages 58 may dissipate heat directly into the circuit board without relying on dissipating heat through shared solder connections and/or vias. Moreover, the transistors 57 of the one or more external power stages 58 may operate with a lower switching frequency than the transistors 57 of the one or more internal power stages 56, which may result in better power efficiency. That is, the more frequently the transistors 57 are switching between activation and deactivation (e.g., the higher the switching frequency), the more power may be lost and the less efficient the mixed topology switching regulator 50. Accordingly, implementing the one or more external power stages 58 may decrease power consumption and increase power efficiency.

The one or more internal power stages 56 and the one or more external power stages 58 may be coupled to one or more capacitive elements 60A and 60B (collectively 60) to reduce output voltage ripple. Additionally, the internal power stage 56A may have one transistor 57 coupled to a ground connection 64A and a second transistor 57 coupled to a ground connection 64B. The one or more external power stages 58 may be coupled to the capacitive element 60B. Additionally, the one or more internal power stages 56 and the one or more external power stages 58 may be coupled to one or more inductive elements 62A, 62B, 62C, and 62D (collectively 62). In particular, the internal power stage 56A may be coupled to inductive element 62A and the internal power stage 56B may be coupled to inductive element 62B. Furthermore, the external power stage 58A may be coupled to inductive element 62C and the external power stage 58B may be coupled to inductive element 62D. The one or more inductive elements 62 may each be coupled to a ground connection 64C. The one or more inductive elements 62 may oppose the incoming supply voltage and downconvert, decrease, or "buck" the supply voltage to a lower output voltage.

It should be noted that the description of components and their corresponding connections are merely examples and are not limiting. There may be additional or fewer internal power stages 56, external power stages 58, capacitive elements 60, and/or inductive elements 62, among other suitable components, that are not shown in FIG. 7. Furthermore, the topology of the mixed topology switching regulator may be modified based on the type of control unit 54. That is, the topology of the mixed topology switching regulator may vary between the buck control unit, the boost control unit, and/or the buck-boost control unit.

During normal operation of the electronic device 10, the mixed topology switching regulator 50 may utilize the one or more internal power stages 56 and/or the one or more external power stages 58 to facilitate conversion of an input DC voltage to a desired output DC voltage. As discussed above, each internal power stages 56 may generate heat when activated. To reduce the thermal output on the package 52, additional external power stages 58 may be activated in response to a temperature of the package 52 or one or more internal power stages 56 exceeding a threshold for safe operation. By reducing expended thermal output of the package 52, performance and lifetime of the components of the package 52, and, as a result, the electronic device 10, may be increased.

Figure 8:
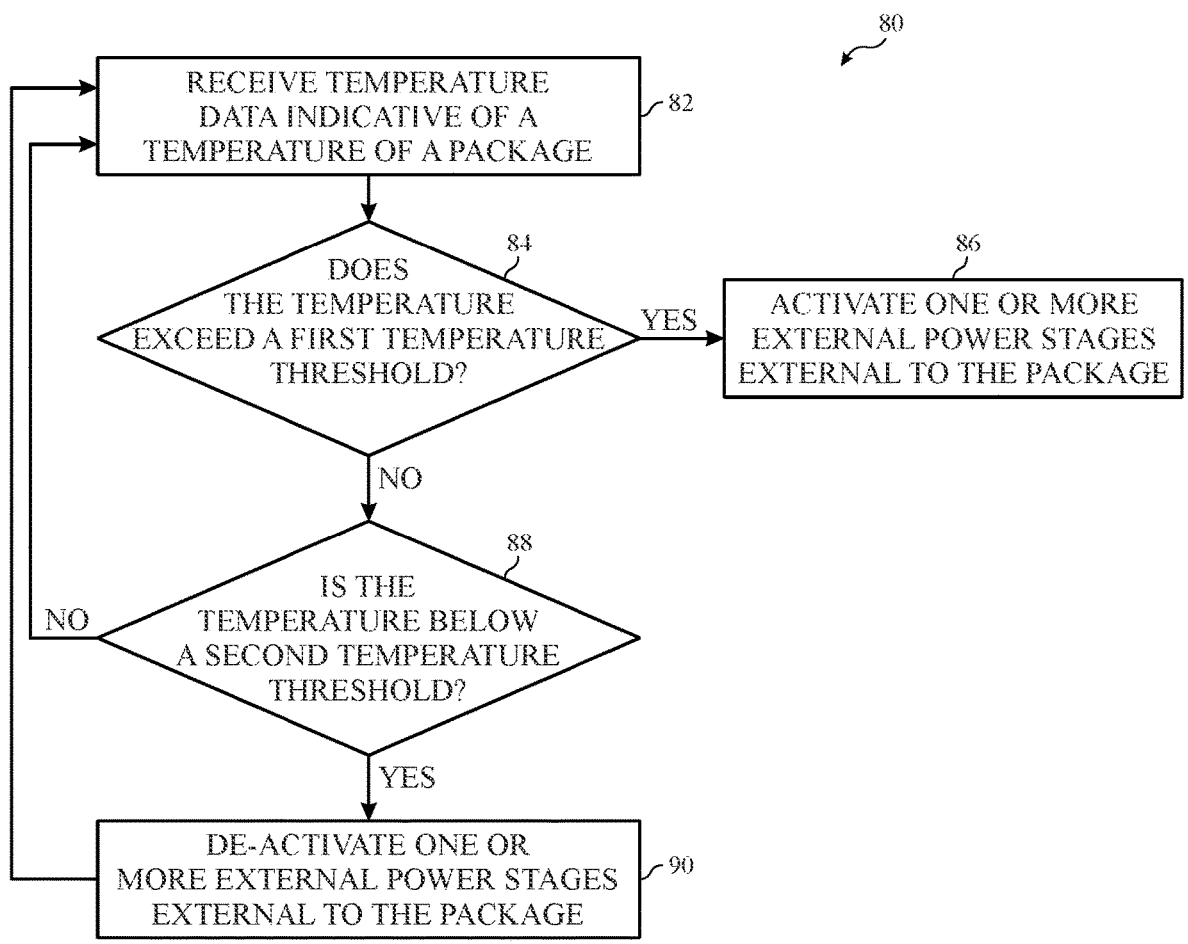
FIG. 8 is a flowchart of a method for decreasing temperature on a semiconductor package of the electronic device of FIG. 1 by offloading power management functions to one or more external power stages based on the temperature of the package, in accordance with an embodiment of the present disclosure.

With the foregoing in mind, FIG. 8 is a flowchart of a method 80 for decreasing temperature on the package 52 by offloading power management functions to one or more external power stages 58 based on the temperature of the package 52, according to embodiments of the present disclosure. Any suitable component that may control the components of the mixed topology switching regulator 50 and/or the electronic device 10, such as the control unit 54, the processor 12, and so on, may perform the method 80. In some embodiments, the method 80 may be implemented by executing instructions stored in a tangible, non-transitory, computer-readable medium, such as the memory 14 or storage 16, using the control unit 54 and/or the processor 12. While the method 80 is described using steps in a specific sequence, it should be understood that the present disclosure contemplates that the described steps may be performed in different sequences than the sequence illustrated, and certain described steps may be skipped or not performed altogether.

At block 82, the control unit 54 receives temperature data indicative of a temperature of the package 52. In particular, there may be one or more temperature sensors (e.g., the one or more sensors 55) disposed on the die such that each stage of the one or more internal power stages 56 is associated with a temperature sensor of the one or more temperature sensors. That is, the one or more temperature sensors may be disposed such that each temperature sensor is in physical or near physical contact with each internal power stage 56. Each temperature sensor may detect a temperature of a respective internal power stage 56, a temperature of the package 52, a temperature of the mixed topology switching regulator 50, and/or a temperature of a die on which the package 52 is disposed. In some embodiments, the mixed topology switching regulator 50 and/or the package 52 may each be associated with a respective temperature sensor that detects a temperature of the mixed topology switching regulator 50 and/or the package 52. The temperature sensor may include a thermistor, a thermocouple, a resistance temperature detector, or any other temperature sensor suitable for detecting temperature at one or more components of the electronic device 10. Moreover, the one or more temperature sensors may be disposed on the same die as the package 52, a different die than the package 52, and/or on top of or below the die on which the package 52 is disposed.

The one or more temperature sensors may be coupled to the control unit 54, which may receive temperature data detected by the one or more temperature sensors. The temperature data may include temperature measurements, current measurements, voltage measurements, resistance measurements, and/or any other suitable measurement detected by the one or more temperature sensors. In some embodiments, the control unit 54 may derive the temperature measurement using the temperature data.

At block 84, the control unit 54 determines if the temperature of the package exceeds a first temperature threshold. The control unit 54 may compare the temperature of the package derived or received based on the temperature data received at block 82 to the first temperature threshold. In some embodiments, the temperature of the package 52 may be determined by performing an arithmetic function (e.g., an average, a summation, a maximum, a minimum, a median, and so on) based on the of one or more of a temperature of the mixed topology switching regulator 50, a temperature of the package 52, a temperature of the one or more internal power stages 56, and/or a temperature of one or more additional components of the package 52. The first temperature threshold may include a pre-determined value stored in the memory 14. In some embodiments, the first temperature threshold may be a dynamically determined value based on historical performance values of the electronic device 10, historical temperature data of the package 52, and/or the one or internal power stages 56. Furthermore, the first temperature threshold may be determined periodically (e.g., every day or more frequently, week or more frequently, month or more frequently, every year or more frequently, etc.). Alternatively, the first temperature threshold may be determined based on one or more occurrences, such as the temperature exceeding the first threshold, the electronic device 10 operating at a high temperature (e.g., exceeding the first threshold) for a period of time (e.g., exceeding a threshold period of time), and/or the temperature increasing beyond that of normal operation. By way of example, control circuitry, such as the control unit 54, may operate silicon packages for integrated circuits to not exceed a threshold temperature (e.g., a junction operating temperature). That is, the junction operating temperature may include a maximum temperature that the package 52 may operate at before a diffusion rate of dopant elements in the package 52, carrier motilities of charge carriers in the package 52, and/or thermal production of charge carriers are affected in the package 52. As such, the first temperature threshold may be referred to as a higher or maximum temperature threshold, and include the junction operating temperature. In some embodiments, the first temperature threshold may include between 90° C. and 150° C., between 100° C. and 140° C., between 110° C. and 130° C., such as 125° C.

In some embodiments, the control unit 54 determines if a temperature of the die exceeds the first temperature threshold. The control unit 54 may compare the temperature of the die derived or received based on the temperature data received at block 82 to the first temperature threshold. The temperature of the die may be determined by performing an arithmetic function (e.g., an average, a summation, a maximum, a minimum, a median, and so on) based on the of one or more of the temperature of the mixed topology switching regulator 50, the temperature of the package 52, the temperature of the one or more internal power stages 56, the temperature of one or more additional components of the package 52, and/or a temperature of the one or more external power stages 58. It should be noted that the first temperature threshold may be adjusted if the control unit 54 is comparing the temperature of the die to the first temperature threshold.

At block 86, the control unit 54 determines that the temperature from the package 52 exceeds the first temperature threshold and activates one or more of the external power stages 58 external to the package 52. In some embodiments, the control unit 54 may activate the one or more internal power stages 56 and/or the one or more external power stages 58 in a sequential order. By way of example, the control unit 54 may activate the internal power stage 56A (e.g., if the temperature from the package 52 exceeds the first temperature threshold) prior to activating any additional internal power stages 56 and/or external power stages 58, depending on the commands sent to the control unit 54 by the processor 12. Moreover, the control unit 54 may activate each internal power stage 56 of the one or more internal power stages 56 prior to activating a first external power stage 58. That is, upon activating all of the one or more internal power stages 56, the control unit 54 may begin activating the one or more external power stages 58 when the temperature from the package 52 exceeds the first temperature threshold. When additional external power stages 58 are activated, the current load of all activated power stages (e.g., each activated internal power stage 56 and each activated external power stage 58) may be shared with the additional external power stages 58, which may reduce overall current load of the one or more internal power stages 56 and/or temperature of the package 52. Furthermore, the control unit 54 and/or the processor 12 may cause the electronic device 10 to decrease current load to reduce the thermal output of the electronic device 10 (e.g., when all of the one or more internal power stages 56 and the one or more external power stages 58 are activated).

At block 88, the control unit 54 determines that the temperature does not exceed the first temperature threshold and determines whether the temperature is below a second temperature threshold. The control unit 54 may compare the temperature derived or received from the temperature data received at block 82 to the second temperature threshold. In particular, the second temperature threshold may include a temperature range suitable for operating the package 52 without decreasing a lifetime of the package 52 and/or reducing the efficiency of the mixed topology switching regulator 50. For example, the second temperature threshold may be between 45° C. and 75° C., between 55° C. and 70° C., between 60° C. and 65° C. The second temperature threshold may be a pre-determined value stored in the memory 14. In some embodiments, the second temperature threshold may be a dynamically determined value based on historical performance values of the electronic device 10, historical temperature data of the package 52 and/or the one or internal power stages 56, or any combination thereof. Furthermore, the second temperature threshold may be determined periodically (e.g., every day or more frequently, week or more frequently, month or more frequently, every year or more frequently, etc.). Alternatively, the second temperature threshold may be determined based on one or more occurrences, such as the temperature falling below the second temperature threshold, the electronic device 10 operating a low temperature (e.g., falling below the second threshold) for a period of time, the temperature decreasing beyond that of normal operation, or any combination thereof.

At block 90, the control unit 54 determines that the temperature at the package 52 is below the second temperature threshold and deactivates the one or more external power stages 58. That is, because the package 52 has cooled down and dissipated thermal energy below the second temperature threshold, the control unit 54 may deactivate the one or more external power stages 58. In some embodiments, the control unit 54 may deactivate the one or more external power stages 58 in a reverse order that each of the one or more external power stages 58 were activated. That is, the control unit 54 may deactivate the external power stage 58B prior to deactivating the external power stage 58A. Moreover, the control unit 54 may deactivate each external power stage 58 of the one or more external power stages 58 prior to deactivating a first internal power stage 56. That is, upon deactivating all of the one or more external power stages 58, the control unit 54 may begin deactivating the one or more internal power stages 56 when the temperature from the package 52 is below the second temperature threshold. Furthermore, the control unit 54 may transmit a signal to the rest of the electronic device 10 to increase current load in the additional components of the electronic device 10 when all of the one or more external power stages 58 and/or all of the one or more internal power stages 56 are deactivated.

In addition to monitoring the temperature to determine when to activate or deactivate the one or more internal power stages 56 and/or the one or more external power stages 58, the control unit 54 may also monitor current in each internal power stage 56 and/or each external power stage 58, the package 52, and/or the mixed topology switching regulator 50 to activate or deactivate the one or more internal power stages 56 and/or the one or more external power stages 58 (e.g., prior to determining when to activate or deactivate the one or more internal power stages 56 and/or the one or more external power stages 58 due to the temperature). That is, in some embodiments, the control unit 54 may limit the current of a particular internal power stage 56 and/or a particular external power stage 58 to a current limit in order to avoid the die from encountering certain consequences, such as failure of components coupled to the package 52. As such, activating the next power stage based on the previous power stage's current exceeding the current limit may take priority over activating the next power stage based on the temperature exceeding the first temperature threshold (e.g., the junction operating temperature).

Figure 9:
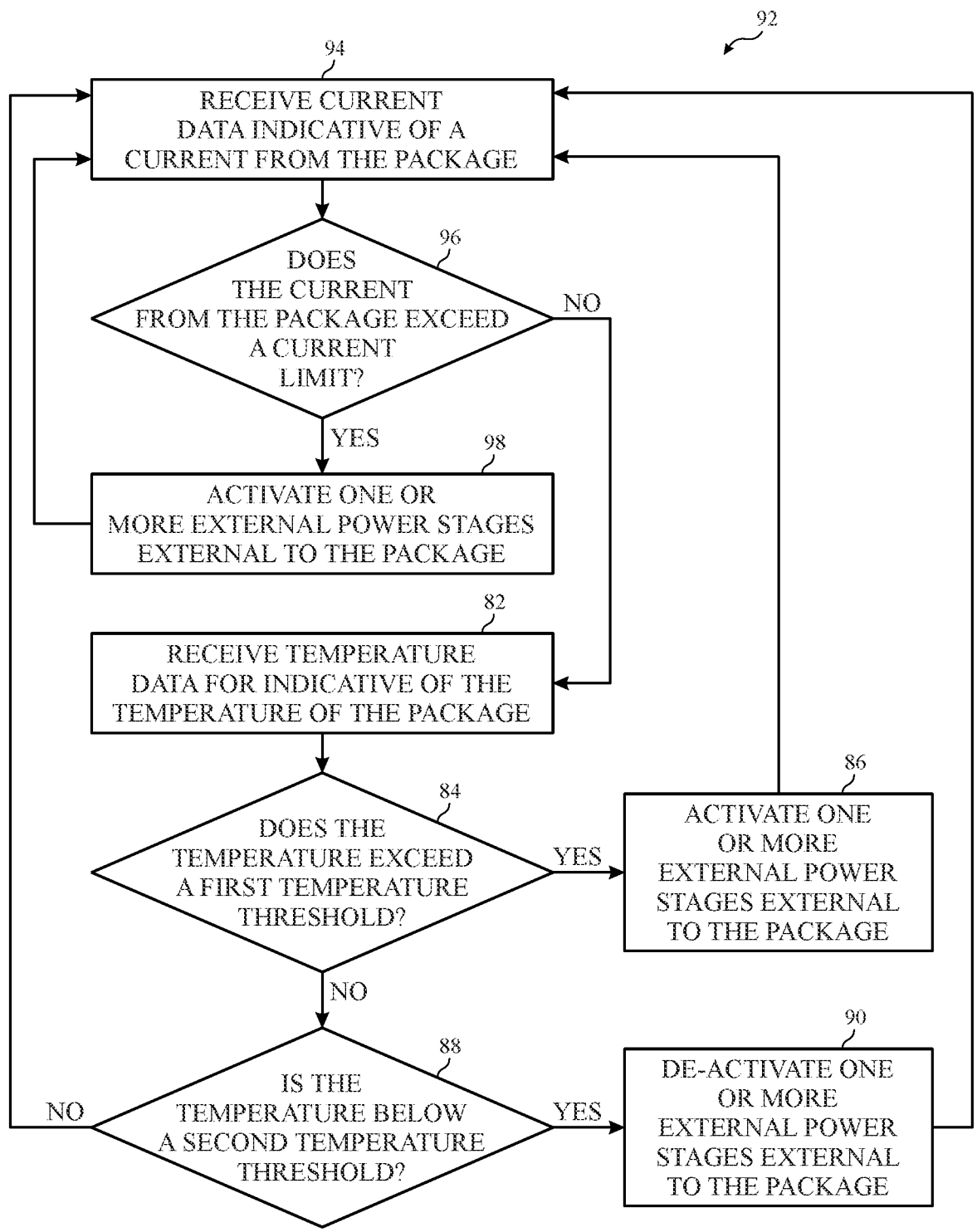
FIG. 9 is a flowchart of a method for decreasing temperature on a semiconductor package of the electronic device of FIG. 1 by offloading power management functions to one or more external power stages based on a current and the temperature of the package, in accordance with an embodiment of the present disclosure.

With the foregoing in mind, FIG. 9 is a flowchart of a method 92 for decreasing temperature on the package 52 by offloading power management functions to one or more external power stages 58 based on a current and the temperature of the package 52. Any suitable component (e.g., a processor) that may control the components of the electronic device 10 and/or the mixed topology switching regulator 50, such as the control unit 54 and/or the processor 12, may perform the method 92. In some embodiments, the method 92 may be implemented by executing instructions stored in a tangible, non-transitory, computer-readable medium, such as the memory 14 or storage 16, using the control unit 54. While the method 92 is described using steps in a specific sequence, it should be understood that the present disclosure contemplates that the described steps may be performed in different sequences than the sequence illustrated, and certain described steps may be skipped or not performed altogether.

At block 94, the control unit 54 receives current data indicative of a current load on the package 52. The current data may be indicative of a current load of a particular power stage and/or the package 52. That is, one or more current sensors (e.g., the one or more sensors 55) may be disposed on the die, disposed in the package 52, built into the control unit 54, or any suitable location for detecting the current of the one or more internal power stages 56, the one or more external power stages 58, the package 52, and/or the die. The one or more current sensors 55 may detect current flowing through one or more components, such as the one or more internal power stages 56, the one or more external power stages 58, the capacitive elements 60, the inductive elements 62, and/or the ground connections 64. By way of example, the one or more current sensors 55 may detect current flowing through each stage of the one or more internal power stages 56 and the one or more external power stages 58 and send the current data to the control unit 54. Moreover, the control unit 54 may derive the current load from the current data based on current measurements, voltage measurements, resistance measurements, and/or any other suitable measurement detected by the one or more current sensors 55.

At block 96, the control unit 54 determines if the current load on the package 52 exceeds a current limit. The control unit 54 may compare the current derived from the current data received at block 94 to the current limit. The current data of the package 52 and the currently activated power stages may be determined by performing an arithmetic function (e.g., an average, a summation, a maximum, a minimum, a median, and so on) based on the current load of each activated internal power stage 56 and/or each activated external power stage 58. The current limit may be a predetermined value stored in the memory 14. In some embodiments, the current limit may be a dynamically determined value based on historical performance values of the electronic device 10, historical current data of the package 52 and/or the one or internal power stages 56, a number of external power stages 58, or any combination thereof. In some embodiments, the current limit may be based on a ratio of a current limit of the one or more internal power stages 56 and a current limit of the one or more external power stages 58. By way of example, the current limit of the one or more internal power stages 56 may be set to 0.75 or less, 0.5 or less, 0.25 or less, or any other suitable ratio or percentage (e.g., ⅓) of the current limit of the one or more external power stages 58. It should understood that the ratio described above is merely an illustrative example and the ratio may be any suitable value. Furthermore, it should be understood that the current limit may refer to an average current limit for each phase of power or an instantaneous current limit for the one or more internal power stages 56 and/or the one or more external power stages 58.

At block 98, the control unit 54 determines that the current from the package 52 exceeds the current limit and cause one or more power stages disposed externally from the package 52 to activate. When the control unit 54 determines that the current derived from the current data exceeds the current limit, the control unit 54 may cause one or more of the external power stages 58 to activate. As discussed above, the control unit 54 may include a sequential order of activation for the one or more internal power stages 56 and/or the one or more external power stages 58. By way of example, the internal power stage 56A may be activated prior to the internal power stage 56B. When the mixed topology switching regulator 50 is active, the internal power stage 56A may be the first power stage activated without activating any other power stages, depending on the one or more commands received by the control unit 54 from the processor 12. When additional external power stages 58 are activated, the current load of each previous power stage is shared among the additional external power stages 58. In some embodiments, the control unit 54 may cause a next internal power stage 56 to activate when all the internal power stages 56 have yet to be activated. That is, the control unit 54 may decide between activating the internal power stages 56 and the external power stages 58 based on the number of internal power stages 56 that have been activated. As such, the control unit 54 may activate the one or more external power stages 58 when the control unit 54 determines that a number of activated internal power stages 56 is equal to a total number of internal power stages 56.

At block 82, the control unit 54 determines that the current from the die does not exceed the current limit and receives temperature data indicative of a temperature of the die. When the control unit 54 determines that the current load of the one or more internal power stages 56 and/or the one or more external power stages 58 does not lead to additional power stages being activated, the control unit 54 may initiate the temperature determination described above in the method 80. As discussed above, there may be one or more temperature sensors 55 disposed on the die such that each stage of the one or more internal power stages 56 is associated with a temperature sensor. That is, each temperature sensor may be in physical or near physical contact with a respective internal power stage 56. In some embodiments, the one or more temperature sensors may be in physical or near physical contact with the package 52. Each temperature sensor may detect a temperature of a respective internal power stage 56, a temperature of the package 52, a temperature of the mixed topology switching regulator 50, and/or a temperature of a die on which the package 52 is disposed. In some embodiments, the mixed topology switching regulator 50 and/or the package 52 may each be associated with a respective temperature sensor that detects a temperature of the mixed topology switching regulator 50 and/or the package 52. Moreover, the one or more temperature sensors may be disposed on the same die as the package 52, a different die than the package 52, and/or on top of or below the die on which the package 52 is disposed. It should be understood that the control unit 54 may determining if the current load exceeds the current limit from the package 52 at blocks 94, 96, and 98, and determining if the temperature exceeds the first temperature threshold and/or is below the second temperature threshold at blocks 82, 84, 86, 88, and 90 independently from one another. That is, the control unit 54 may carry out blocks 82, 84, 86, 88, and 90 and blocks 94, 96, and 98 in parallel or serially. In some embodiments, the control unit 54 may be controlled via firmware, software, or by a hardware state machine.

At block 84, the control unit 54 determines if the temperature exceeds a first temperature threshold. It should be noted that the block 84 of FIG. 9 is similar to the block 84 of FIG. 8 discussed above. The control unit 54 may compare the temperature derived or received based on the temperature data received at block 82 to the first temperature threshold.

At block 86, the control unit 54 determines that the temperature from the die exceeds the first temperature threshold and activate one or more of the one or more external power stages 58 external to the package 52. It should be noted that the block 86 of FIG. 9 is similar to the block 86 of FIG. 8 discussed above. As discussed above, the control unit 54 may activate the one or more internal power stages 56 and/or the one or more external power stages 58 in a sequential order. By way of example, the control unit 54 may activate the internal power stage 56A (e.g., if the temperature from the package 52 exceeds the first temperature threshold) prior to activating any additional internal power stages 56 and/or external power stages 58, depending on the commands sent to the control unit 54 by the processor 12. Moreover, the control unit 54 may activate each internal power stage 56 of the one or more internal power stages 56 prior to activating a first external power stage 58. That is, upon activating all of the one or more internal power stages 56, the control unit 54 may begin activating the one or more external power stages 58 when the temperature from the package 52 exceeds the first temperature threshold.

At block 88, the control unit 54 determines that the temperature does not exceed the first temperature threshold and determine whether the temperature is below a second temperature threshold. It should be noted that the block 88 of FIG. 9 is similar to the block 88 of FIG. 8 discussed above. The control unit 54 may compare the temperature derived or received from the temperature data received at block 82 to the second temperature threshold.

At block 90, the control unit 54 determines that the temperature from the package 52 is below the second temperature threshold and deactivates the one or more external power stages 58 of the one or more external power stages 58. It should be noted that the block 90 of FIG. 9 is similar to the block 90 of FIG. 8 discussed above. The control unit 54 may deactivate the one or more external power stages 58 in a reverse order that each of the one or more external power stages 58 were activated. That is, the control unit 54 may deactivate the external power stage 58B prior to deactivating the external power stage 58A. Moreover, the control unit 54 may deactivate each external power stage 58 of the one or more external power stages 58 prior to deactivating a first internal power stage 56. That is, upon deactivating all of the one or more external power stages 58, the control unit 54 may begin deactivating the one or more internal power stages 56 when the temperature from the package 52 is below the second temperature threshold.

It should be noted that at any point during blocks 82, 84, 86, 88, and 90, the control unit 54 may detect that the current of the one or more activated power stages is exceeding the current limit. The control unit 54 may begin to activate additional power stages based on the processes performed at blocks 94, 96, and 98. That is, the control unit 54 may be continuously receiving the current data for each activated power stage simultaneously while receiving the temperature data for each activated power stage. That is, the current limit detection and the temperature detection by the control unit 54 may be separated into two different loops that are performed in parallel or serially. For example, the control unit 54 may perform a first loop having blocks 94, 96, and 98, and, in block 98, if the control unit 54 determines that the current is greater than the current limit, the control unit 54 may perform the actions described at block 86, and then return to block 94. Otherwise, the control unit 54 may perform the actions described in block 90, and then return to block 94. The control unit 54 may also perform a second loop in parallel with (e.g., concurrently or simultaneously) with performing the first loop, the second loop having blocks 82, 84, 86, 88, and 90, and returning back to block 82.

Furthermore, the activation of additional power stages may be performed prior to the temperature exceeding the first temperature threshold or the current exceeding the current limit. The control unit 54 may determine that there will be an incoming current load that exceeds the current limit and may activate additional power stages such that the current of each activated power stage does not exceed (e.g., is less than or equal to) the current limit for each power stage.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. An electronic device, comprising:
a die;
one or more power stages of a switching regulator that are disposed on the die;
one or more sensors electrically coupled to the one or more power stages and configured to determine data associated with a temperature of the die;
one or more off-die power stages of the switching regulator that are external to the die; and
processing circuitry configured to offload a portion of a current load associated with the die to the one or more off-die power stages based on the data indicating that the temperature is greater than a temperature threshold.

2. The electronic device of claim 1, wherein each power stage of the one or more power stages is smaller in size than each off-die power stage of the one or more off-die power stages.

3. The electronic device of claim 1, wherein the one or more sensors comprise one or more temperature sensors, and each power stage of the one or more power stages is coupled to a respective temperature sensor of the one or more temperature sensors.

4. The electronic device of claim 1, wherein the data is associated with the current load associated with the die, the processing circuitry is configured to cause the one or more off-die power stages to activate based on the data indicating that the current load is greater than a current load threshold.

5. The electronic device of claim 4, wherein the processing circuitry is configured to dynamically determine the current load threshold based on historical performance values of the electronic device, historical current data associated with the die, historical current data associated with the one or more power stages, historical current data associated with the one or more off-die power stages, a number of the one or more power stages, a number of the one or more off-die power stages, or any combination thereof.

6. The electronic device of claim 4, wherein the processing circuitry is configured to decrease the current load associated with the die based on the data indicating that the current is greater than the current load threshold.

7. The electronic device of claim 4, wherein the processing circuitry is configured to, in response to determining the current load does not exceed the current load threshold, determine if the temperature exceeds the temperature threshold.

8. The electronic device of claim 1, wherein the processing circuitry is configured to dynamically determine the temperature threshold based on historical performance values of the electronic device, historical temperature data associated with the die, historical temperature data associated with the one or more power stages, or any combination thereof.

9. The electronic device of claim 1, wherein the temperature threshold is a pre-determined value.

10. A method, comprising:
receiving, via a processor, sensor data associated with one or more internal power stages of a switching regulator that are disposed on a die;
determining, via the processor, that the sensor data indicates a temperature of the die that is greater than a first temperature threshold; and
reducing, via the processor, a current load associated with the one or more internal power stages by activating one or more external power stages of the switching regulator based on the sensor data indicating the temperature of the die is greater than the first temperature threshold, wherein the one or more external power stages are disposed external to the die.

11. The method of claim 10, comprising:
determining, via the processor, that the sensor data indicates the current load on the die that is greater than a current limit; and
causing, via the processor, the one or more external power stages to activate based on the sensor data indicating the current load is greater than the current limit.

12. The method of claim 11, comprising:
receiving, via the processor, additional sensor data associated with the one or more internal power stages;
determining, via the processor, that the additional sensor data indicates the current load of the die that is less than or equal to the current limit; and
causing, via the processor, the one or more external power stages to deactivate based on the additional sensor data indicating the current load is less than the current limit.

13. The method of claim 12, comprising determining, via the processor, that the additional sensor data indicates the temperature of the die is less than a second temperature threshold, wherein causing, via the processor, the one or more external power stages to deactivate is based on the additional sensor data indicating that the temperature of the die is less than the second temperature threshold.

14. The method of claim 10, comprising:
receiving, via the processor, a number of activated power stages of the one or more internal power stages; and
determining, via the processor, that the number of activated power stages of the one or more internal power stages is equal to a total number of power stages of the one or more internal power stages, wherein causing, via the processor, the one or more external power stages to activate is based on the number of activated power stages of the one or more internal power stages being equal to the total number of power stages of the one or more internal power stages.

15. An electronic device, comprising:
a circuit package comprising a first set of power stages; and
a second set of power stages coupled to the first set of power stages, wherein the first set of power stages and the second set of power stages are each configured to convert an input voltage to an output voltage, wherein the second set of power stages are disposed externally to the circuit package, and wherein the second set of power stages are activated to reduce a current load of the first set of power stages based on a temperature of the first set of power stages exceeding a temperature threshold of the circuit package.

16. The electronic device of claim 15, wherein:
the circuit package is disposed on a first die; and
the second set of power stages are disposed on a second die.

17. The electronic device of claim 15, wherein the second set of power stages are disposed on a same die comprising the circuit package.

18. The electronic device of claim 15, wherein:
the first set of power stages is associated with a first switching frequency; and
the second set of power stages is associated with a second switching frequency, wherein the first switching frequency is greater than the second switching frequency.

19. The electronic device of claim 15, wherein the second set of power stages comprises one or more field effect transistors.

20. The electronic device of claim 15, wherein each power stage of the first set of power stages and the second set of power stages is configured to be activated independently of other power stages of the first set of power stages and the second set of power stages.

\* \* \* \* \*